United States Patent Office 3,506,909
Patented Apr. 14, 1970

3,506,909
CIRCUIT ARRANGEMENT FOR THE EXCITATION OF A DC MACHINE

Klaus Böhm and Gerhard Rumold, Erlangen, Germany, assignors to Siemens Aktiengesellschaft, a corporation of Germany
Filed July 22, 1968, Ser. No. 746,527
Claims priority, application Germany, Aug. 5, 1967, 1,613,409
Int. Cl. H02p 9/30
U.S. Cl. 322—63   7 Claims

ABSTRACT OF THE DISCLOSURE

A DC machine having a pair of inductively coupled field windings and is excited from an AC power network by a circuit including controlled rectifiers connected between the AC power network and one of the windings for periodically exciting the one of the windings and a short-circuit of the other of the windings.

DESCRIPTION OF THE INVENTION

Figure 1:
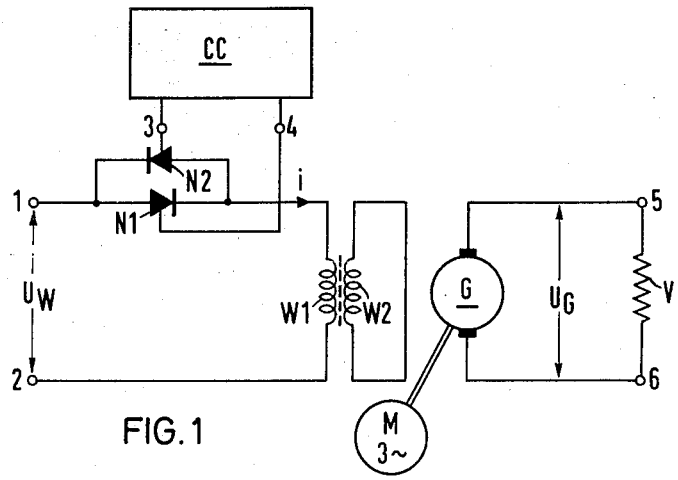

The present invention relates to DC machines. More particularly, our invention relates to a circuit arrangement for the excitation of a DC machine. The field excitation of the DC machine is continuously varied by controlled rectifiers connected to an AC power source or network.

A Leonard or Ward-Leonard set is often used for regulated or controlled four-quadrant drives. If the rotary speed of a direct current drive in the set is to be varied via its armature voltage, said armature voltage is delivered by the Leonard generator of the set.

It is known to derive the excitation voltage of a DC generator from a direct current network or power source for the purpose of supplying a direct current load and to thereby vary the excitation voltage by variable or controllable electrical resistance. It is also known, in order to supply direct current to the excitation winding of a generator, to derive the required direct current from the local AC power source or network via a rectifier and, also, to utilize variable or controllable resistance to vary the excitation current. This creates the disadvantage that voltage drops of considerable magnitude may occur at the variable resistance and that there is a significant power loss in the excitation circuit.

In order to overcome the aforementioned disadvantage, it is customary and known to eliminate the control resistance from the DC excitation circuit, and to replace said resistance with controlled rectifiers such as, for example semiconductor controlled rectifiers or thyristors. The controlled rectifiers, under suitable control, provide proper excitation of the generator with regard to the magnitude and direction of current. The control of the controlled rectifiers permits continuous variation of the field excitation and thus also permits a corresponding control of the output voltage of the direct current generator. A simple thyristor circuit for energizing the excitation winding of a Leonard generator from an alternating current network or supply source should utilize the smallest possible number of thyristors. The simplest thyristor circuit is the one pulse circuit which has one thyristor for each current direction, due to the required reversal of the current direction for the generator field. Such a circuit has the disadvantage that the magnetic energy supplied to the excitation winding is reduced in each period or cycle of the AC supply. This makes a sensible technical operation impossible, since the output voltage of the generator would then vary or alternate periodically between the remanence voltage and a specific maximum magnitude. It is known to alleviate this disadvantage by utilizing two excitation windings and a free-running diode connected in parallel with a winding.

The principal object of the present invention is to provide a new and improved circuit arrangement for the excitation of a DC machine.

An object of the present invention is to provide a circuit arrangement for varying the voltage of a Leonard generator in order to control the rotary speed of the motor coupled to said generator.

An object of the present invention is to provide a circuit arrangement which controls the excitation of a DC machine with efficiency, effectiveness and reliability and is of simple structure.

In accordance with the present invention, one of a pair of magnetically or inductively coupled field windings of a generator is periodically excited by the excitation current and the other of the pair of windings is short-circuited. In the circuit arrangement of the present invention, the winding which is excited by the excitation current is energized via controlled rectifiers, either only during the positive, only during the negative, or during part of each of the positive and negative half cycles.

In accordance with the present invention, a circuit arrangement for the excitation of a DC machine having a pair of inductively coupled field windings from an AC power network via controlled rectifiers comprises exciting means connected to one of the windings for periodically exciting the one of the windings and means for short-circuiting the other of the windings.

The DC machine may be a DC generator or a Leonard generator. The exciting means includes controlled rectifiers exciting the one of the windings for the positive half cycle, the negative half cycle or part of each of the half cycles. The DC machine has a plurality of stator poles each having a winding and each of the windings is short-circuited.

The controlled rectifiers comprise thyristors. The exciting means comprises a voltage supply connected to the one of the windings for applying an alternating voltage and a pair of thyristors interposed between the voltage supply and the one of the windings for periodically exciting the one of the windings. The thyristors are connected in parallel with opposite conductivity between the voltage supply and the one of the windings.

Figure 2:
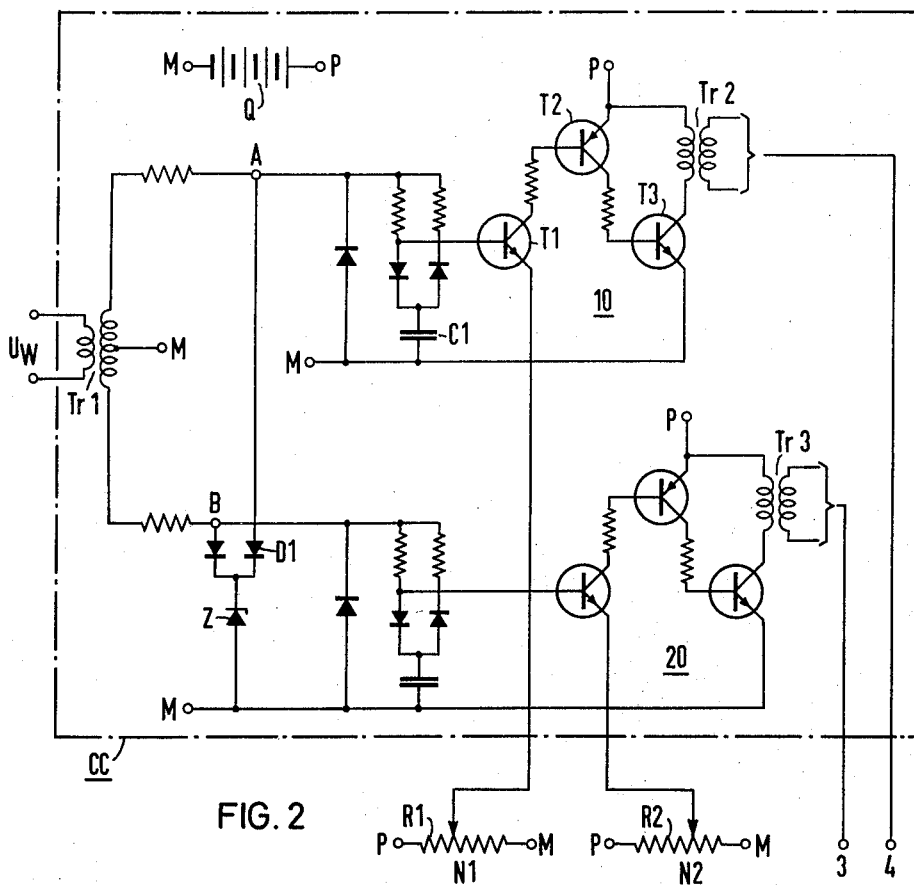

In order that the present invention may be readily carried into effect, it will now be described with reference to the accompanying drawing, wherein:

FIG. 1 is a circuit diagram of an embodiment of the circuit arrangement of the present invention for the excitation of a DC machine; and FIG. 2 is a circuit diagram of a control unit which may be utilized as the control unit CC of the circuit arrangement of FIG. 1.

In FIG. 1, a direct current generator G is driven by a motor M. The generator G supplies a load V via output terminals 5 and 6 of said load. The output voltage of the generator G is $U_G$. The generator G has a pair of inductively or magnetically coupled field windings W1 and W2. The winding W2 is short-circuited. The winding W1 is supplied with direct current from the local alternating current network or power source via terminals 1 and 2 and controlled rectifiers N1 and N2 such as, for example, semiconductor controlled rectifiers or thyristors.

The semiconductor controlled rectifiers or thyristors N1 and N2 are controlled in operation by a control unit CC via terminals 4 and 3. The terminal 4 is connected to the control electrode of the controlled rectifier N1 and the terminal 3 is connected to the control electrode of the controlled rectifier N2. The control unit CC may comprise any suitable power supply circuit including a switch for supplying firing current to a selected one of the controlled rectifiers N1 and N2. The firing current is supplied to the selected rectifier at specific intervals in accordance with a predetermined program. The selected one of the thyristors N1 and N2 is fired or switched to its conductive condition only during a half cycle period. The selected thyristor is thus operated or conductive only during the positive half cycle, or only during the negative half cycle, or during part of the positive half cycle and part of the negative half cycle.

It may be assumed that the short-circuited winding W2 is not utilized and that the thyristor N1 is fired or switched to its conductive condition during the positive half cycle of the alternating energizing voltage $U_W$ provided at the terminals 1 and 2 from the AC power source or network. A current $i$ then flows in the field winding W1 of the generator G. The extinguishing or switching to the non-conductive condition of the thyristor N1 is desired at zero passage of the energizing alternating voltage $U_W$ during the transition to the negative half cycle. The thyristor N1 remains in its conductive condition, however, until the current $i$ is completely decreased in magnitude in the field winding W1 and said current becomes zero (inverted rectifier operation).

When the field winding W2 is short-circuited, said winding prevents a rapid current change and maintains the field excitation during the negative half cycle of the alternating energizing voltage $U_W$. Furthermore, the short-circuited field winding insures that the thyristor N1 may be extinguished or switched to its non-conductive condition at the beginning of the negative half cycle. The excitation flux $(i)(W1)$ is thus transferred from the winding W1 to the winding W2. The short-circuited auxiliary field winding W2 also reduces the 50 Hz. harmonic of the excitation flux in a desired manner.

If the polarity of the output voltage $U_G$ is to be reversed at the load V, all that is necessary is that the excitation current be reversed in direction. This may be accomplished by firing the thyristor N2 instead of N1, always during the respective negative half cycle of the alternating energizing voltage $U_W$. The transfer or commutating of the excitation flux from the field winding W1 to the short-circuited winding W2 is accomplished in a corresponding manner.

The illustrated connection of the thyristors N1 and N2, in parallel with opposite conductivity or polarities between the AC voltage source and the field winding W1, is especially impervious to disturbances. Although the current $i$ is reversed during the half cycle changeover, no disturbances occur due to inverted rectifier operation, current circulation, or the like.

The cross section of the wire of the winding and the number of turns of the short-circuited auxiliary field winding depend upon the smoothing time constant needed to smooth the excitation flux. Each of the stator poles of the DC machine has a short-circuited winding W2. Each winding is preferably short-circuited separately, around a pole, however. The body of the field winding W2 may be made of conductive material, in order to provide a short-circuited winding of simple structure and operation.

FIG. 2 illustrates an embodiment of a control unit which may be utilized as the control unit CC of the circuit arrangement of FIG. 1. The control unit CC controls the thyristors N1 and N2 via a transformer Tr1 having a primary winding connected to the local alternating current power source so that it has the alternating energizing voltage $U_W$ applied thereto, and a secondary winding. The secondary winding of the input transformer Tr1 has a central tap connection which is directly connected to the negative polarity terminal M of a DC voltage source Q. The DC voltage source Q has a positive polarity terminal P.

The thyristor N1 is controlled by a control circuit 10 and the thyristor N2 is controlled by a control circuit 20. The gate control of the thyristors N1 and N2 is indicated as the control of the slidable contacts of a pair of potentiometers R1 and R2, respectively. Suitable control amplifiers may replace the manually-operated potentiometers R1 and R2.

If a point A is positive relative to the negative polarity terminal M or to the positive half wave of $U_W$, the sinusoidal voltage of the local AC power source is converted to a trapezoidal voltage in the control circuit 10. This is accomplished with the assistance of a Zener diode and a diode D1. The trapezoidal voltage at the point A charges a capacitor C1 of the control circuit 10 with a sawtooth voltage which is synchronized with the alternating energizing voltage $U_W$. Such voltage appears at the base electrode of a transistor T1.

The transistor T1 is controlled or switched to its conductive condition when the sawtooth voltage at its base electrode is more positive than the control voltage derived from the potentiometer R1. Transistors T2 and T3 are maintained in their conductive condition as long as the transistor T1 is in its conductive condition. Thus, a firing pulse is provided at the output terminal 4 and is supplied to the control electrode of the transistor N1 (FIG. 1) via an output transformer Tr2.

If the point A is negative with respect to the negative polarity terminal M, the capacitor C1 of the control circuit 10 discharges and the transistors T1, T2 and T3 are switched to their non-conductive condition.

The control circuit 20 of the control unit CC functions in a manner similar to that of the control circuit 10 and controls the firing of the thyristor N2 of FIG. 1 via an output transformer Tr3 and the output terminal 3. The control by the control circuit 20 is instituted when the point B becomes positive relative to the negative polarity terminal M.

While the invention has been described by means of a specific example and in a specific embodiment, we do not wish to be limited thereto, for obvious modifications will occur to those skilled in the art without departing from the spirit and scope of the invention.

We claim:

1. A circuit arrangement for the excitation of a DC machine having a pair of inductively coupled field windings from an AC power network via controlled rectifier means, said circuit arrangement comprising exciting means connected to one of said windings for periodically exciting said one of said windings and means for short-circuiting the other of said windings.

2. A circuit arrangement as claimed in claim 1, wherein said DC machine is a DC generator.

3. A circuit arrangement as claimed in claim 1, wherein said DC machine is a Leonard generator.

4. A circuit arrangement as claimed in claim 1, wherein said exciting means includes controlled rectifier means exciting said one of said windings for one of the positive half cycle and part of each of said half cycles.

5. A circuit arrangement as claimed in claim 1, wherein said DC machine has a plurality of stator poles each having a winding and each of said windings is short-circuited.

6. A circuit arrangement as claimed in claim 4, wherein said controlled rectifier means comprises a pair of thyristors.

7. A circuit arrangement as claimed in claim 4, wherein said exciting means comprises voltage supply means connected to said one of said windings for applying an alternating voltage and a pair of thyristors interposed between said voltage supply means and said one of said windings for periodically exciting said one of said windings, said thyristors being connected in parallel with opposite conductivity directions between said voltage supply means and said one of said windings.

References Cited

UNITED STATES PATENTS 2,796,580  6/1957  Maggs _____ 322—63 X

ORIS L. RADER, Primary Examiner

H. HUBERFELD, Assistant Examiner

U.S. Cl. X.R.

310—184; 318—528; 322—68, 73